Feb. 25, 1969    T. W. WILLIAMS III    3,429,544

AIR TABLE

Filed June 15, 1967

*INVENTOR.*
THOMAS WALLEY WILLIAMS III
BY

Robert J Schuller
ATTORNEY

United States Patent Office 3,429,544
Patented Feb. 25, 1969

3,429,544
AIR TABLE
Thomas Walley Willliams III, Belmont, Mass., assignor to The Ealing Corporation, Cambridge, Mass., a corporation of Delaware
Filed June 15, 1967, Ser. No. 646,223
U.S. Cl. 248—346
Int. Cl. A47g 29/00; A45d 42/14
7 Claims

ABSTRACT OF THE DISCLOSURE

A laminated air table having a top surface and a bottom surface of thin board, and a honeycomb layer between them. The top surface has a number of small holes distributed therein, each hole communicating with at least one cell of the honeycomb located below the top surface. The cells of the honeycomb are arranged with periodicity and channels are provided so that all of the cells of each period communicate with one another. A large air chamber is included for coupling a supply of air to the plurality of channels simultaneously. The method of making the table involves forming it upside down on a preformed surface of a block, forcing at least the top surface of the table to conform to the preformed surface, permitting bonding agent between layers to set while the table is under pressure, and drilling the holes in the top surface into the honeycomb, each hole being sufficiently larger in diameter than the honeycomb walls so that no hole is blind.

---

This invention relates to air tables, and more particularly to novel means for providing an air-bearing surface.

Considerable interest has been displayed in the use of air-suspended devices for the study of physical laws such as the conservation of momentum, motion of the center of the mass and the like. Two-dimensional air tables have therefore been created to provide an air cushion or bearing which supports the items or pucks which are thus movable in the two dimensional plane of the table with considerably reduced friction. Generally the air cushion is provided by a perforated surface placed over an air-distribution manifold. These tables, while simple in theory, tend to be difficult and expensive to make, primarily because of problems in maintaining the planarity of the table surface and in obtaining uniform air distribution across the entire table surface. A number of devices making use of air-bearing surfaces have been desecribed in the American Journal of Physics; 28, 147 (1960); 30, 503 (1962); 31, 255 (1963); and particularly 31, 867 (1963).

In copending application Ser. No. 612,227 there has been described a novel air table capable of being manufactured, at least in part, from wood-fiberboard, and which is thus comparatively inexpensive. Although this novel air table has generally been quite satisfactory, because of the materials from which the table is made changes in ambient relative humidity and temperature may alter the flatness of the table.

The present invention therefore has as its principal objects, the provision of an improvement on novel air table structures of the type described in said copending application. Yet another object of the present invention is to provide such a structure which is inexpensive and simple to manufacture while possesing excellent surface and air distribution characteristics and which is quite stable with respect to changes in ambient humidity and temperature. Still another object of the present invention is to provide a method of making an improved air table.

*Brief summary of the invention*

To effect the foregoing and other objects, the present invention generally is in the form of a laminated structure having an air metering top surface element including a plurality of small perforations therethrough, a bottom supporting surface element, and, sandwiched between the two surface elements, a layer comprising a plurality of elongated tubular sieve elements having their long axes parallel to one another and disposed normally to the surface elements, the layer having a plurality of transverse slots disposed adjacent one or both of the surface elements so as to constitute an air distribution manifold connected to every sieve element. The perforations in the top surface element are preferably much larger than the cross section dimension of the walls of the sieve elements, are uniform in size, and regularly distributed so that each perforation communicates with at least one sieve element. Means are provided for creating substantially uniform air flow through the slots and thus through the sieve elements.

Other objects of the invention will in part be obvious and will in part appear hereinafter. The invention accordingly comprises the apparatus possessing the construction, combination of elements, and arrangement of parts and the method comprising the several steps and the relation of one or more of such steps with respect to each of the others, all of which are exemplified in the following detailed disclosure, and the scope of the application of which will be indicated in the claims.

For a fuller understanding of the nature and objects of the present invention, reference should be had to the following detailed description taken in connection with the accompanying drawings wherein.

It will be appreciated that the term "air table" as used herein is intended to include devices other than those merely providing an air bearing or cushion over a surface. Clearly, the latter posits the provision of a positive pressure air supply and, in use, the flow of air outwardly from perforations in the top surface. However, the same device can, with the application of a negative pressure to its air-distribution system provide a reversal of the air flow into the perforations and thus serve as a vacuum frame.

Figure 1:
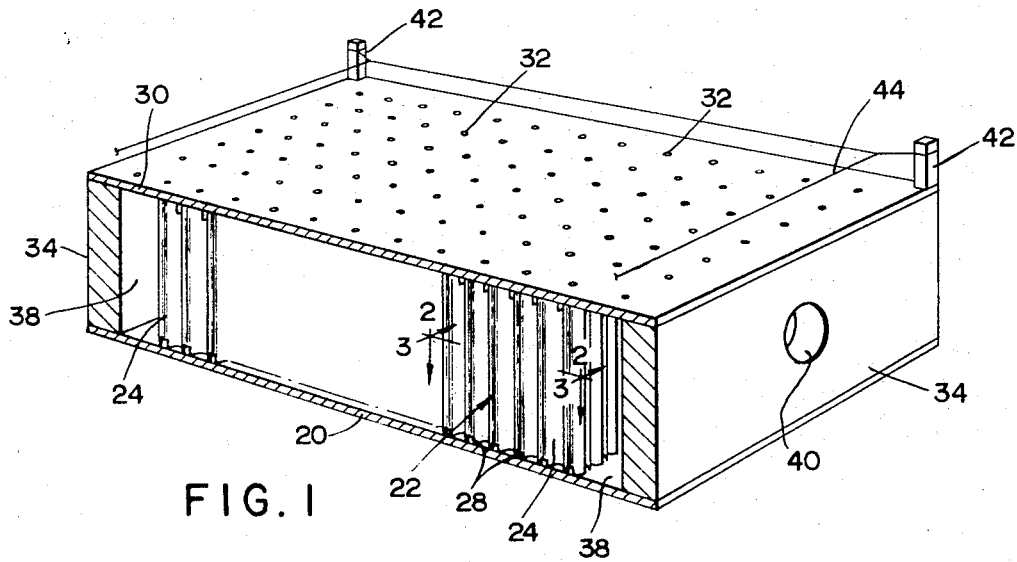
FIG. 1 is a perspective view, partly broken away showing an assemblage incorporating the principles of the present invention.

Referring now to the drawing, there will be seen in FIG. 1 an exemplary embodiment of an air table incorporating the principles of the present invention, and comprising a comparatively thin bottom support layer 20 having a reasonably high modulus of elasticity. Layer 20 is preferably a sheet of substantially rigid, imperforate, lightweight material and typically can be a high density wood fiber—lignin board sold under the trade name "Benelex 70 Lofting Board," by the Masonite Corporation, Chicago, Ill.—a sheet of aluminum, or other like lightweight material. However, wood fiber board has a tendency to absorb moisture with consequent deformation, and metal may be unsuitable where the pucks to be used on the air table may be magnetic and thus subject to deceleration due to the eddy currents the pucks may set up in the metal. Consequently, in the preferred embodiment layer 20 is a paper-based phenolic, high pressure laminate, with a melamine coating on both surfaces, commercially available under the tradename "Parkwood Kick Plate," from Parkwood Laminates Co., Wakefield, Mass., or a similar board sold as "Micarta" board by Westinghouse Electric Co. In any of the foregoing, the sheet may be rectangular, circular or the like, depending on the desires of the builder of the device and typically is about 1/8″ in thickness.

A major consideration in maintaining flatness is to achieve a structure rigid enough to withstand the deformation caused by the weight of the structure itself. This type of beam rigidity is achieved by bonding to one surface of layer 20, a corresponding large flat surface of lightweight honeycomb type core or sieve layer 22. The thickness of layer 22 is determined for a given size of table by calculations based upon standard formulas for the deflection of laminated panels. Layer 22 comprises a plurality of hollow elongated tubular elements 24 having their long axes parallel to one another and substantially normal to the surface of layer 20 to which layer 22 is bonded, the elongated dimensions of elements 24 being all substantially equal to one another and much larger than the maxium cross-section dimension of tubular elements 24. Elements 24 are disposed adjacent one another in an array which is periodic in both dimensions of the plane of a large surface of layer 22. Each element 24 can be circular, hexagonal, approximately diamond shaped or the like in cross section.

Figure 2:
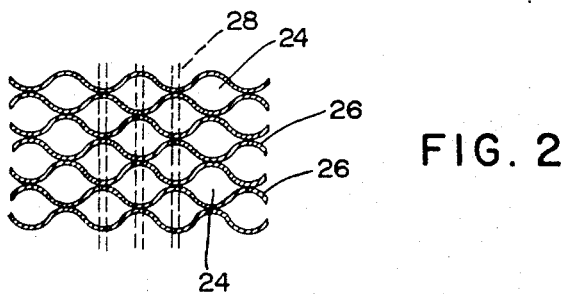
FIG. 2 is a partial cross section taken along the lines 2—2 in FIG. 1 through sieve elements thereof.

In the form shown, particularly in FIG. 2, layer 22 is formed of a multiplicity of thin walls or strips 26, each strip being curved in an approximately sinusoidal configuration. Alternate strips are 180° out of phase with one another and where the curve of one strip contacts the curve of another strip the strips are sealed to one another. Preferably, the strips are made of a phenolic impregnated paper, a synthetic plastic or the like of high shear strength and the strips are sealed to one another typically with an epoxy type adhesive.

In order to provide means for distributing air under pressure (either negative or positive) substantially uniformly throughout the honeycomb structure of layer 22, all of the elements 24 of each periodic array are joined to one another by a common conduit aligned substantially normally to the long axes of elements 24, such as conduits 28 shown schematically in FIG. 2. Most simply, these conduits are provided by forming a notch or groove, each such groove being preferably disposed across a surface of layer 22 in a direction along a line intersecting each tubular element 24 of a corresponding array.

Figure 3:
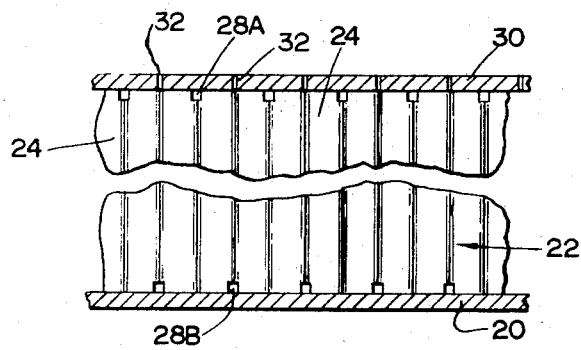
FIG. 3 is a partial cross section partly broken, taken along the lines 3—3 of FIG. 1 through the sieve elements.

In a preferred embodiment, conduits 28 are formed in alternate sequence from one array to the next array on opposite surfaces of layer 22 as shown in FIG. 3. Thus, for example, where each array is substantially linear and the conduits joining the elements of each array are parallel to one another, the first, third, fifth, and other odd conduits are formed as grooves 28A on one surface of layer 22, while the second, fourth, and other even numbered conduits are formed as grooves 28B on the opposite surface of layer 22. Thus, as will be seen, when fed from a common air source, approximately as much air will tend to flow along the bottom of the table as along the top. Properly spaced conduits will, therefore, exhibit a periodic spacing substantially not greater than that of the arrays of elements 24, and the conduit width should be much less than that of the comparable width of the sieve elements. Preferably, the periodic spacing between conduits in the plane of layer 22 should be somewhat smaller than the periodic spacing between arrays of sieve elements. This deliberate mismatch is provided so that every sieve element or cell of layer 22 will communicate with at least one conduit even though there may be small aberrations in size or periodicity of the honeycomb structure.

Affixed to the other large flat surface of layer 22 is top layer 30 which is preferably identical in size and shape to layer 20 and formed of the same material as layer 20. Both layers 20 and 30 are preferably bonded to layer 22 by epoxy cement or some other similar strong, waterproof adhesive. Distributed on layer 30 and extending completely therethrough substantially normal to the plane of layer 30 is a pattern of perforations 32, for example, formed by a No. 74 drill bit (.0225″ diameter). It is important that each of perforations 32 preferably be larger in diameter than the maximum thickness of the walls of elements 24 so that holes can be drilled anywhere through layer 30 and into the space within an element 24 regardless of the structure of the core. This permits the spacing between perforations to be based upon other considerations, such as how small a puck one wishes to support on the finished table, or what jigs are conveniently available to guide the drills. Since the adhesive bonding layers 22 and 30 together will tend to form a fillet where the edges of the sieve elements join layer 30, the drills must be extended through such fillets so that every one of perforations 32 communicates with at least one sieve element.

Perforations 32, of course, are substantially uniform in size and are usually much smaller then the cross-section dimensions of the sieve elements with which they communicate. It will be seen that perforations 32, therefore, provide a high pneumatic resistance to air flow therethrough so that substantially the largest portion of any air pressure drop through the air table occurs across layer 30.

In the preferred embodiment layers 20 and 30 are substantially of the same shape and dimensions and are registered with one another. On the other hand, the breadth and width of layer 22 is somewhat lesser than the comparable dimensions of layers 20 and 30, and layer 22 is positioned so that layers 20 and 30 provide an overhang, preferably completely about the perforations of layer 22. Corresponding edges of layers 20 and 30 are sealed to one another by side panels 34 to provide edge rigidity. Panels 34 are preferably much thicker than the material of layers 20 and 30. Preferably, side panels 34 are of materials having the same temperature and humidity characteristics as layers 20 and 30 but since perfect conformity to the desired surface shape will not be maintained in any case, other materials of less stringent requirements can be used. Due to the smaller width and breadth of layer 22 and the provisions of side panels 34, it will be seen that an air plenum chamber 38 is formed surrounding the narrower periphery of layer 22. It is only necessary that air plenum chamber 38, however, be formed adjacent those portions of the periphery of layer 22 through which conduits 28 open. Thus, the air plenum chamber communicates via conduits 28 with each sieve element of the air table to provide a common air source. It will be appreciated that the dimensions of the air plenum chamber are considerably greater at minimum cross-section than the minimum cross section dimension of any of conduits 28 or sieve elements 24 which, in turn, are considerably greater than the cross section dimensions of perforations 32. This again insures that the bulk of the pressure drop in air flow between the plenum chamber and the air outside of the table adjacent top layer 30 occurs substantially through perforations 32. The air flow system provided thereby substantially insures that the amount of air flow out of each of perforations 32 is uniform and is almost independent of whether or not a piece of flat material floats on an air cushion above a number of the perforations.

Entrance port 40 is provided, for example, through one of side panels 34 for connecting air plenum chamber 38 to a source of air at superatmospheric pressure, or a negative pressure source as the case may be.

In operation, for example, with air at super-atmospheric pressure introduced at port 40, air plenum chamber 38 will be pressurized so that air will flow simultaneously from chamber 38 into all of conduits 28, and thence into sieve elements 24. The air pressure is, therefore, distributed substantially uniformly throughout the honeycomb structure of layer 22. Because perforations 32 are very small, air is driven outwardly from corresponding sieve elements at substantially the same velocity for all of the perforations. This provides an air cushion above the top surface of layer 30, which cushion will easily support a puck or disk, typically of plastic, with substantially no friction when the puck is moved. The puck, as well known in the art, is usually of considerably greater cross section dimension than the spacing between adjacent perforations 32, so that regardless of the position of the puck, air streams flowing from a plurality of perforations 32 provide the supporting air layer. If the holes 32 are in a square array the minimum diameter that will float is approximately 2½ times the interhole spacing.

Because both layers 20 and 30 preferably have both surfaces thereof coated with a material that is substantially non-absorbent with respect to moisture, changes in the relative humidity of the ambient air will have little or no effect upon the table. Additionally, the air distribution system provided within the table, particularly where conduits 28 are alternated on opposite surfaces of layer 22, tends to maintain the entire table structure at the same temperature and humidity throughout, and thermal or hygroscopic expansion, if any, of layer 30 is balanced by a similar thermal or hygroscopic expansion of layer 20. This is an important consideration because differential expansion between layers 20 and 30 can seriously impair the flatness of the table.

Typically, for experimental use of the air table, a low fence or barrier which would absorb limited energy from moving pucks is provided and to this end about the periphery of layer 30 there is provided a plurality of posts 42 which support and are connected to one another by tautly strung wire 44, as is usual for such tables.

An alternate method for providing a reflecting wire bumper is to place a metal frame on top of the table to hold the taut wire. This configuration prevents the tension in the wire from distorting the table. After the wire is tight the corners of the frame are affixed to the table with screws through oversized holes so that no sideways forces are imparted to the table in mounting.

A preferred method of construction involves the use of a very rigid foundation block, typically a thick slab of granite, glass or the like, the upper surface of which is formed to a desired configuration, generally plane, to any reasonable desired tolerance. Layer 30, which will form the top of the air table, is laid upon the foundation block and layer 22 is superimposed substantially centrally thereon to provide the desired spacing between the edges of the layers which will define air plenum chamber 38. Layer 22 is then cemented to layer 30. Layer 20 is next laid on top of layer 22 and cemented thereto in registered relation to layer 30. Care should be used to employ a cement which does not set up or cure until well after the successive layers are all assembled, so that the position of the layers may be changed laterally with respect to one another in the event that there is flexure of any of the layers. Side panels 34 are then cemented to the peripheral edges of both layers 20 and 30. In the preferred embodiment the four side panels 34 are assembled ahead of time into a frame which is placed down upon layer 20 at the same time as layer 22. Typically layers 20 and 30 are allowed to overlap the side panels 34 so that perfect alignment is not necessary. The overlap is trimmed later after the cement sets. Side panels 34 are important pieces since they are wide enough to have a glue joint which will resist the shear force due to pressure against them by air in the plenum.

Finally, the entire sandwich thus formed is placed under pressure substantially uniformly applied to layer 20 and directed normally to the surface of block. This can be achieved by using an air bag, vacuum frame or stiff platen covered with a resilient material, so that a uniform pressure can be applied everyhere to the sandwich. The flexibility of the layers allows them to conform closely to the surface configuration of the foundation block so that the cement, when set, maintains the preestablished structural characteristics. Although any minor thickness irregularity in the sandwich becomes a non-uniformity in the surface of layer 20. Since the surface accuracy of layer 20 is not particularly important, such nonuniformity is acceptable. The layers of the structure should be relatively flat before being laminated, since any initial bow in a layer will show up after lamination as a prestress in the table. However, since the effect of this stress is reduced by the ratio of the stiffness of that layer before lamination to the stiffness of the entire structure after lamination, very small stresses are inconsequential.

Conduits 28 may be formed in a varied number of ways. For example, the layer of expanded honeycomb can simply be machined with a rotary saw blade or similar tool to cut grooves in the appropriate direction on the desired surfaces. Alternatively, unexpanded honeycomb can readily be machined in a similar manner and then expended. Expanded honeycomb can be temporarily compressed in the same direction as the grooves are to be cut, and the compressed honeycomb similarly can be machined. If the honeycomb structure of layer 22 is frangible, the conduits can simply be crushed along the surface of the honeycomb with rollers or the like. While it is preferred that the conduits lie along the surface of layer 24, conduits can also be formed by perforating intermediate portions of the walls of the sieve element, as by drilling.

Since certain changes may be made in the above apparatus and processes without departing from the scope of the invention herein involved it is intended that all matter contained in the above description or shown in the accompanying drawing shall be interpreted in an illustrative and not in a limiting sense.

What is claimed is:

1. An air table of laminar structure comprising in combination:
    a support layer comprising a plurality of hollow elongated cells having their axes of elongation directed substantially parallel to one another and perpendicularly to the common plane of said table, said cells being aligned in periodic arrays;
    a pair of sheets of substantially air and moisture impervious material respectively affixed to opposite surfaces of said support layer; one of said sheets having a plurality of perforations therethrough each communicating with the interior of at least one of said cells;
    air conduits each positioned for joining to one another each cell of at least a corresponding array and an air plenum chamber disposed adjacent and communicating with all of said air conduits.

2. An air table as defined in claim 1 wherein said perforations all have substantially the same configuration and dimensions, and each is substantially smaller in cross section dimension than the minimum cross section dimension of said cells and said conduits.

3. An air table as defined in claim 1 wherein each of said conduits is defined by a plurality of openings in walls of the cells of the corresponding array.

4. An air table as defined in claim 1 wherein said conduits are arranged so that a first plurality thereof lie parallel to one another adjacent one surface of said support layer and extend through alternate arrays; and
    a second plurality thereof lie parallel to one another and to said first plurality but adjacent the other surface of said support layer and extend through the remainder of said arrays.

5. Method of forming an air table and comprising the steps of:
    on a preformed surface of a substantially rigid foundation, laying down a first layer of air and moisture impervious material;
    forming conduits through a support layer having a plurality of substantially identical elongated hollow cells in periodic arrays with their long axes parallel to one another and perpendicular to the surface of said layer, each of said conduits extending along a corresponding array so as to join substantially all of the cells of said corresponding array;

laying down said support layer on said first layer;

laying down on said support layer a second layer of air and moisture impervious material;

applying a bonding agent between each adjoining layer;

applying a substantially uniform pressure to said second layer substantially normally to said preformed surface;

delaying the setting of said agent to a permanent bond until at least after application of said pressure;

maintaining said pressure until said agent has set; and forming a plurality of perforations through said first layer to the interior of said cells.

6. Method as defined in claim 5 wherein each of said conduits is formed by cutting a groove normal to said cell axes along at least one surface of said support layer through a corresponding array.

7. Method as defined in claim 5 including laying down on said first layer a frame of material substantially impervious to air and of the same thickness as said support layer, said frame being sufficiently larger in its inside dimensions so that an air plenum will separate said frame from the support layer.

References Cited

UNITED STATES PATENTS

| | | |
|---|---|---|
| 2,815,249 | 12/1957 | Curtenius. |
| 2,879,875 | 3/1959 | Swackhamer. |
| 3,107,078 | 10/1963 | Schutt _____ 248—363 |
| 3,126,192 | 3/1964 | Stein _____ 248—362 |
| 3,190,460 | 6/1965 | Rubin _____ 248—362 XR |

JOHN PETO, *Primary Examiner.*

U.S. Cl. X.R.

248—363; 214—1; 161—407